United States Patent

Ward, Jr.

[15] 3,678,513
[45] July 18, 1972

[54] PEAK SELECTION CIRCUIT AND APPARATUS UTILIZING SAME

[72] Inventor: William H. Ward, Jr., Huntington Beach, Calif.
[73] Assignee: General Monitors, Inc., Costa Mesa, Calif.
[22] Filed: Oct. 28, 1970
[21] Appl. No.: 84,698

[52] U.S. Cl. ............................340/414, 307/235, 328/137, 340/172, 340/237
[51] Int. Cl. .................................................G08b 23/00
[58] Field of Search ...........340/414, 415, 172; 307/235; 328/137

[56] References Cited

UNITED STATES PATENTS

| | | | |
|---|---|---|---|
| 3,158,849 | 11/1964 | Thaler | 340/172 X |
| 3,426,217 | 2/1969 | Womble | 307/235 |
| 2,775,693 | 12/1956 | Berwin | 328/137 X |
| 3,092,732 | 6/1963 | Milford | 340/414 X |
| 3,147,464 | 9/1964 | Spielman | 340/415 |
| 3,166,679 | 1/1965 | Paufue | 340/172 X |
| 3,181,008 | 4/1965 | Huckins | 307/235 X |
| 3,292,150 | 12/1966 | Wood | 307/235 X |
| 3,311,881 | 3/1967 | Mellott | 340/172 X |

Primary Examiner—David L. Trafton
Attorney—Charles G. Lyon, John B. Young, Richard Elgar Lyon, Robert Douglas Lyon, Roland N. Smoot, Conrad R. Solum, Jr., James D. Geriah and Robert M. Taylor, Jr.

[57] ABSTRACT

A peak selection circuit connectible to receive several variable amplitude signals for selecting the signal of greatest amplitude and indicating which channel provided such signal. This peak selection circuit can be used, for example, in an apparatus for detecting a gas at first and second locations which comprises a first sensor for providing a first electrical signal having a characteristic variable in accordance with the concentration of the gas at the first location, a second sensor for providing a second electrical signal having a characteristic variable in accordance with the concentration of the gas at the second location, a circuit coupled to the first and second sensors for automatically selecting the signal having the characteristic indicative of the greatest amount of the gas, and an indicator responsive to the selected signal for providing an indication as to which of the signals was selected by the circuit.

7 Claims, 2 Drawing Figures

Patented July 18, 1972 3,678,513

INVENTOR:
William H. Ward Jr.
By: Smyth, Roston & Pavitt
ATTORNEYS

PEAK SELECTION CIRCUIT AND APPARATUS UTILIZING SAME

BACKGROUND OF THE INVENTION

As is well known, a gas detector is used to sense the presence of one or more preselected gases and to provide information as to the concentration of the selected gas in the environment. For example, it is often necessary or desirable to detect the presence of certain combustible gases such as hydrogen and hydrocarbon gases. If combustible gas is detected or is detected in predetermined quantities, the detector may provide an audible and/or visual alarm and/or bring about certain remedial or preventative action such as shutting down equipment, etc.

A detector utilizes a sensor for detecting the gas and various other equipment such as a power supply and a readout device. One typical prior art detector includes one sensor per power supply, and this is satisfactory when gas detection at only a single location is all that is required. However, for certain applications, it may be necessary or desirable to monitor the environment at multiple locations. Accordingly, it is necessary to utilize one of these prior art detectors for each location at which gas is to be monitored. This is expensive and requires considerable space for storage of the detectors. Moreover, the operator must read several dials to obtain the information which he requires.

In an effort to overcome these problems, it has been proposed to use multiple sensors and a single power source and a single readout device. The signals from the several sensors are summed so that the operator is not advised of the condition at each of the locations being monitored. Rather, the summed signals represent the sum of the amounts or concentrations of the gas at the locations being monitored. Thus, the gas concentration at any given location is unknown by the operator. If a high gas concentration reading is obtained, the operator is not advised whether the high reading is due to all locations having a high, but acceptable, gas concentration or due to an alarm condition at one of the locations. Moreover, even if the reading clearly indicates an alarm condition, the operator is not automatically advised as to which of the remote locations being monitored has the alarm condition.

SUMMARY OF THE INVENTION

The present invention provides a gas detection apparatus which solves all of the above-noted problems. With the present invention one or more sensors are used with a single power source and readout device. The information provided by the apparatus informs the operator of the location having the gas concentration which is closest to a preselected concentration. Although the concepts of the present invention are applicable to detecting the location having a gas concentration closest to a preselected concentration, for many applications it is desired to know the location having the greatest concentration of gas. No multiplexing or scanning of the sensors is required.

Each of the sensors provides an electrical signal having a characteristic which varies in accordance with changes in the concentration of the gas being detected. Appropriate circuitry selects the signal having the characteristic which is indicative of the greatest concentration of gas. This selection function results in providing the operator with information as to which location has the highest concentration of the gas. The characteristic of the selected signal is used to provide the operator with information as to the concentration of the gas at the selected location.

Although electrical signals have numerous characteristics which may be caused to vary in accordance with a condition being sensed, it is preferred to use signal amplitude as the signal characteristic. Similarly, it is desirable to have signal amplitude increase with gas concentration.

Another feature of this invention is that stable operation is obtained even if several locations have approximately the same concentration of the gas being detected. Without the stabilizing means of this invention, the normal sensitivity of the system would produce rapid fluctuation between channels which happen to have nearly identical gas concentration. The stabilizing means requires that in order for a new channel to be selected, the signal therefor must surpass the signal of the selected channel by a predetermined amount.

In a preferred practice of the invention, a peak selection circuit is used to select the signal which represents the greatest gas concentration. The present invention provides a novel peak selection circuit which can be used to advantage with the detection apparatus of this invention and in numerous other environments. The peak selection circuit generally includes one semiconductor for each sensor and an impedance which may be a constant current circuit or a resistor and which may be considered a current source. The semiconductors are coupled in parallel with each other and in series with the impedance.

Each of the semiconductors is preferably a transistor, although a diode or tube could be used. Tubes are not practical for several reasons including heat production and the fact that it is difficult or impossible to match the tubes. One advantage of a three terminal active device or impedance such as a transistor over a diode for this application is that the collector current can be amplified and used to provide an indication of the location having the greatest concentration of gas.

The bases of the transistors are coupled to receive the variable amplitude signals. The arrangement is such that only the transistor which receives the greatest amplitude signal will be turned on and the other transistors will be back biased and turned off. The collector current of the conducting transistor is amplified and utilized as noted above such as in connection with an indicator.

To stabilize the peak selection circuit, the transistor which is conducting is biased not only by the variable amplitude signal but also by a small signal from another source such as a small signal from the indicator circuit. In order for one of the other transistors to become the conducting transistor, the variable amplitude signal applied thereto must have an amplitude at least equal to the sum of the amplitudes of the signals biasing the conducting transistor.

The transistors are preferably arranged in a common emitter circuit. The voltage amplitude of the conductor interconnecting the emitters is substantially equal to the variable amplitude signals applied to the base of the conducting transistor less the base emitter voltage drop of the conducting transistor. Thus, the potential of this conductor is indicative of the concentration of the gas at the selected location and a readout device in the form of a voltmeter can be coupled thereto.

To compensate for the base emitter drop of the conducting transistor, it is necessary that the voltmeter be appropriately offset. This result is simply and advantageously obtained with the present invention by coupling a PN junction in series with the voltmeter and the common emitter conductor. The PN junction has the same characteristics as the transistors and is arranged, in effect, to add back in the base emitter voltage drop of the conducting transistor.

The invention may best be understood by reference to the following description taken in connection with the accompanying illustrative drawing.

DESCRIPTION OF THE PREFERRED EMBODIMENT

Figure 1:
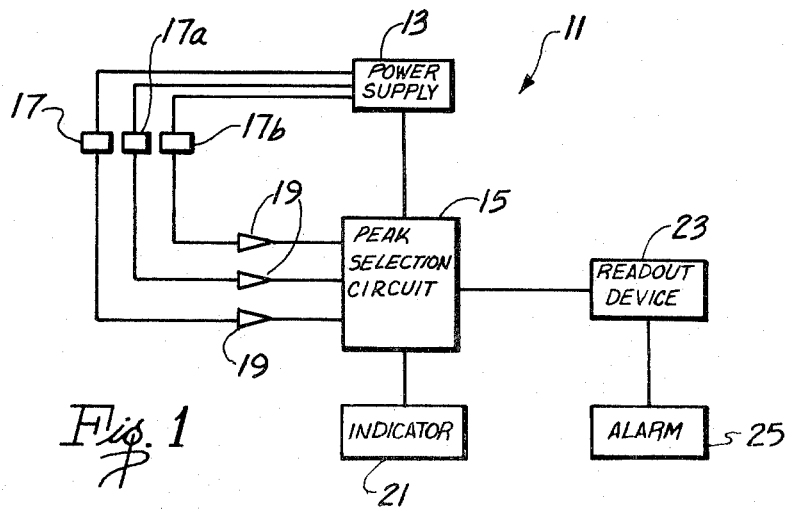
FIG. 1 is a block diagram of a gas detection apparatus constructed in accordance with the teachings of this invention.

FIG. 1 of the drawing illustrates a gas detector 11. The detector 11 includes a power source such as a dc power source 13 suitably arranged to supply dc power to a peak selection circuit 15 and to several sensors 17, 17a and 17b. Each of the sensors 17, 17a and 17b is positionable in a preselected remote location at which the concentration of a gas is to be monitored and is capable of providing a signal having an amplitude which is proportional to the concentration of the type or types of gas being monitored.

A preferred form of sensor employs a Wheatstone bridge circuit with one of the legs of the bridge having a catalytic bead thereon capable of reacting exothermically with the gas being detected while another of the legs of the bridge contains an inert bead. The exothermic reaction of the catalytic bead with the gas being detected unbalances the bridge and provides a signal having an amplitude indicative of the concentration of the gas being detected. This type of sensor is conventional and for this reason is not described in detail herein. Of course, other types of sensors capable of producing a signal having a characteristic which varies in accordance with changes in concentration of the gas being tested can be utilized. Although three of the sensors are illustrated in FIG. 1, the number of these sensors employed in combination with a single power supply 13 and peak selection circuit 15 depends on the number of locations at which gas concentration is to be monitored.

The signals from the sensors 17 are amplified by amplifiers 19, respectively, and the amplified signals are fed to the peak selection circuit 15. The peak selection circuit 15 selects the variable amplitude signal supplied thereto having the greatest amplitude and an indicator 21 provides a visual indication as to which of the sensors 17 has been selected by the circuit 15. The selected variable amplitude signal is processed in such a manner by the peak selection circuit 15 that its amplitude is indicative of the concentration of the gas at the selected sensor 17 and a visual display of the gas concentration at the selected sensor is provided by a readout device 23. The readout device 23 may be a voltmeter appropriately calibrated to show concentration of the gas being detected. Thus, the detector 11 continuously monitors the concentration of a preselected gas at numerous remote locations, indicates the remote location having the highest concentration of such gas, and informs the operator as to the concentration of the gas at the selected location. The peak selection circuit 15 requires power for operation, and this power may be drawn from the power supply 13.

The concentration of the gas at the locations having the sensors 17, 17a and 17b may be measured in various ways, and this information can be provided, for example, in a form of a percent of the detected gas in the environment. The apparatus 11 may be utilized to detect any kind of gas and combustible gases such as hydrogen and hydrocarbons are merely illustrative. If the concentration of the detected gas reaches a predetermined level, an alarm 25 may be actuated to advise the operator of the alarm condition. The alarm can be audio or visual or any other way of notifying the operator of the alarm condition. In addition, the alarm 25 may cause various remedial or preventative action to occur such as the shutting down of certain equipment.

Figure 2:
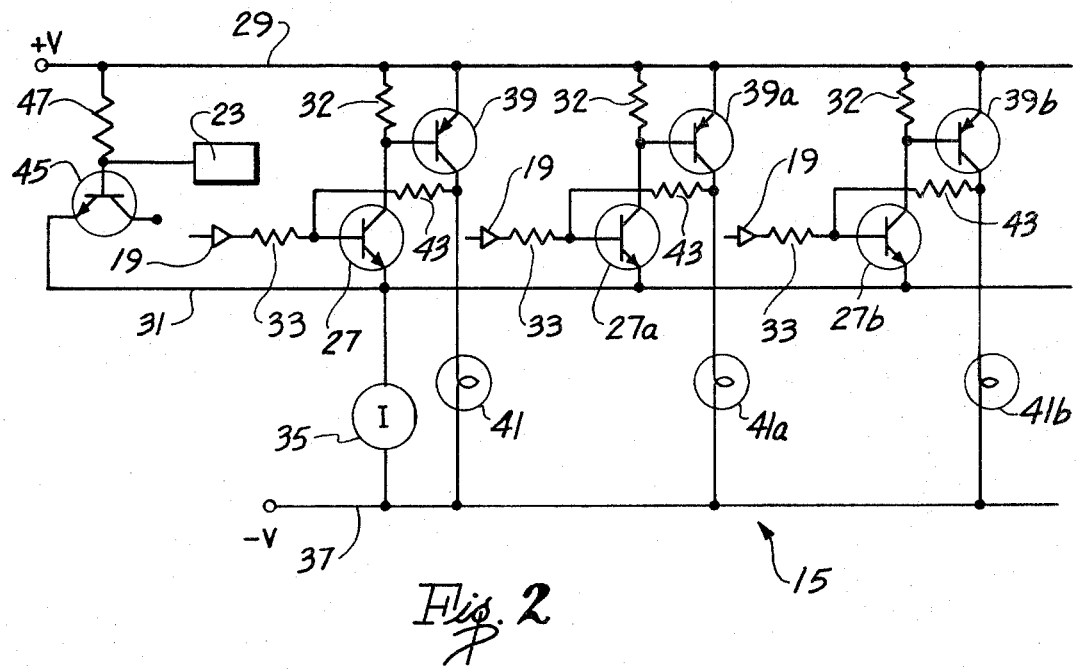
FIG. 2 is a schematic view of a peak selection circuit constructed in accordance with the teachings of this invention and adapted for use in the gas detection apparatus of FIG. 1.

Except to the extend illustrated in FIG. 2, the components shown in FIG. 1 are conventional. FIG. 2 shows a preferred form of the peak selection circuit 15. The peak selection circuit 15 includes a number of transistors 27, 27a and 27b connected in parallel across conductors 29 and 31. The transistors 27, 27a and 27b have substantially the same rating. The conductor 29 is maintained at a suitable positive potential which may be, for example, 12 volts by the power supply 13 or any other suitable power supply. The transistors 27, 27a and 27b are arranged in a common emitter circuit with their collectors being coupled to the conductor 29 and with their emitters being coupled to the conductor 31. The collectors of the transistors 27, 27a and 27b are in series with resistors 32.

It should be understood that any number of the transistors 27, 27a and 27b may be utilized depending upon the number of variable amplitude signals which are to be handled by the peak selection circuit 15. In the embodiment illustrated, one of the transistors 27, 27a and 27b is provided for each of the sensors 17, 17a and 17b. Accordingly, three of the transistors 27, 27a and 27b are illustrated in FIG. 2 in order to correspond with the number of the sensors 17, 17a and 17b shown in FIG. 1. The bases of the transistors 27, 27a and 27b are coupled to receive the variable amplitude input signals from the sensors 17, 17a and 17b, respectively, through the amplifiers 19 and resistors 33.

A constant current circuit 35 is coupled between the conductor 31 and a conductor 37. The constant current circuit 35 is in series with each of the transistors 27, 27a and 27b. The constant current circuit 35 may be of conventional design and, for this reason, the details thereof are not illustrated. If desired a resistor can be used in lieu of the constant current circuit; however, the latter gives a better switching action especially over a wide input voltage range. The conductor 37 is maintained at a negative potential which may be, for example, 6 volts which can be supplied by the power supply 13 or by any other suitable power supply.

Three additional transistors 39, 39a and 39b are coupled in parallel across the conductors 29 and 37 with the emitters thereof being coupled to the conductor 29 and with the collectors thereof being coupled to the conductor 37. The bases of the transistors 39, 39a and 39b are coupled to be controlled by the collector current of the transistors 27, 27a and 27b, respectively. Indicators in the form of lamps 41, 41a and 41b are connected in series between the conductor 37 and the collectors of the transistors 39, 39a and 39b, respectively. Although the lamps 41, 41a and 41b form the indicator of the peak selection 15 illustrated, it should be understood that other suitable indicating devices may be employed. Resistors 43 are coupled between the bases of the transistors 27, 27a and 27b and the collectors of the transistors 39, 39a and 39b, respectively.

Readout is provided by the readout device 23 which may be a voltmeter. A transistor 45 and a resistor 47 are coupled in series between the conductors 29 and 31 and the readout device is coupled to read the voltage between the transistor 45 and the resistor 47. Only the base emitter junction of the transistor 45 is used in the circuit. The base emitter junction of the transistor 45 should have substantially the same characteristics as the base emitter junction of the transistors 27, 27a and 27b.

The peak selection circuit 15 can be coupled to any source or sources of variable amplitude signals and the detector 11 is merely illustrative of the type of device in which the peak selection circuit may be utilized. The signals supplied to the peak selection circuit 15 are of the type having an amplitude variable in accordance with variations in a condition being monitored. In the embodiment illustrated, the amplitude of the signals from the sensors 17, 17a and 17b increases with an increase in concentration of gas at the location of the particular sensor. By way of example, the signals from the amplifiers 19 may range from approximately zero volt to a positive one volt with the positive one volt indicating a maximum gas concentration.

Assuming that the variable amplitude signal fed to the transistor 27 is higher than the corresponding signal fed to the transistors 27a and 27b, the transistor 27 is rendered conductive and the transistors 27a and 27b remain nonconductive. During normal operation the transistor 27 operates to satisfy the current requirements of the constant current circuit 35. The potential of the conductor 31 will substantially equal the voltage of the variable signal applied to the base of the transistor 27 minus the base emitter voltage drop of the transistor 27. By way of example, the base emitter voltage drop may be approximately 0.55 volts in which event the conductor 31 for many values of the signal supplied to the base of the transistor 27 will be at a negative potential. The emitters of the transistors 27a and 27b will be at substantially the same potential as the conductor 31 and as the signals applied to the bases of the transistors 27a and 27b are less than the signals applied to the base of the transistor 27, these transistors are back biased and are not conductive. Accordingly, only the transistor which receives the highest input signal is rendered conductive. In this manner, the peak selection circuit 15 selects the signal supplied thereto which has the greatest amplitude.

To advise the operator of this selection, the peak selection circuit illuminates the indicator light 41 and does not illuminate the other indicator lights 41a and 41b. When the transistor 27 is rendered conductive, current is drawn through the associated resistor 32 and the voltage of the base of the transistor 39 is moved toward the voltage of the collector of the transistor 39 to turn the latter on. With the transistor 39 conducting, current is drawn by the indicator light 41 to illuminate the latter thereby advising the operator that the location having the sensor 17 thereat contains the maximum concentration of the gas being detected.

The resistor 43 which is coupled to the base of the transistor 27 provides a small amount of positive feedback for a hysteresis or stabilizing effect. Thus, the resultant signal applied to the base of the transistor 27 is the sum of the input signal received from the sensor 17 and the feedback signal. Once the transistor 39 is rendered conductive and a feedback signal is applied to the base of the transistor 27, the potential of the conductor 31 equals the resultant signal less the base emitter voltage drop of the transistor 27. Accordingly, in order for another one of the transistors such as the transistor 27a to become conductive thereby shutting off the transistor 27, it is necessary that the input signal from the sensor 17a be increased so that the amplitude thereof exceeds the amplitude of the resultant signal applied to the base of the transistor 27. In actual practice the positive feedback signal through the resistor 43 is kept very small and the hysteresis added may be of the order of 5 to 10 millivolts.

As the voltage of the conductor 31 varies in accordance with the selected or maximum input signal from the sensors, readout can be provided by merely measuring the potential of the conductor 31. However, because of the base emitter drop of the transistor 27, it is necessary to offset the voltmeter or readout device 23 accordingly. According to the present invention, this result is accomplished by the transistor 45 and the resistor 47 arranged in the manner illustrated. The transistor 45 has the same rating as the transistor 27, and accordingly, the base emitter characteristics are substantially the same. The voltage at the readout device 23 equals the voltage of the conductor 31 plus the voltage drop across the base emitter junction of the transistor 45. Thus, the voltage of the readout device 23 substantially equals the voltage of the input signal to the transistor 27. The positive feedback signal from the resistor 43 is negligible and can be ignored; however, the voltmeter could be offset, if desired, for the number of millivolts of positive feedback which will be obtained. A diode having the same characteristics as the base emitter junction of the transistor 27 may be utilized in lieu of the transistor 45.

Should the input signal from the sensor 17a, amplifier 19 and resistor 33, which is applied to the base of the transistor 27a be increased so that it exceeds the amplitude of the input signal from the sensor 17 plus the positive feedback signal applied to the base of the transistor 27, The transistor 27a is rendered conductive. In this event the voltage of the conductor 31 equals the difference between the resultant signal applied to the base of the transistor 27a and the base emitter voltage drop of the transistor 27a. This back biases the transistor 27 turning the latter off. With the transistor 27 being nonconductive, the transistor 39 is rendered nonconductive to extinguish the indicator light 41. Conduction by the transistor 27a causes the transistor 39a to become conductive and illuminates the indicator light 41. The transistor 27a is then provided with a feedback signal through its associated resistor 43. Of course, the readout device 23 then provides the operator with information as to the gas concentration at the location monitored by the sensor 17a.

The resistors 33 are small compared to the resistors 32 and 43, and the resistors 33 and 43 cooperate to maintain the positive feedback signal in the desired range in relation to the range of the variable amplitude input signals. The value of resistor 47 can be adjusted until the voltage offset between the highest input voltage and the voltage read by the voltmeter 23 is negligible.

Many variations are possible within the framework of the present invention. For example, although the detection apparatus disclosed in the specific embodiment is a gas detector, this basic apparatus could be used to detect other substances if it were equipped with sensors suitable for detecting other substances. The peak selection circuit 15 is usable in many different environments to monitor and select a peak voltage amplitude and to continuously measure the selected voltage and is not limited to use with a detection apparatus. For example, the peak selection circuit can be used with a device for charging several batteries to indicate which battery becomes fully charged first. The peak selection circuit described in the specific embodiment selects the input signal having the greatest positive amplitude; however, by reversing all of the voltage polarities and by changing the transistors 27, 27a, 27b, 39, 39a, 39b and 45 from the NPN type to the PNP type, the circuit will select the signal having the greatest negative amplitude. Accordingly, as used herein "peak" selection has reference to selection of either the signal of greatest positive amplitude or the greatest negative amplitude depending upon whether the maximum negative or the maximum positive signal is being sought. Similarly, the signal of "greatest amplitude" is the signal having the largest negative amplitude if peak negative values are sought and is the signal having the largest positive amplitude if peak positive values are sought.

Although an exemplary embodiment of the invention has been shown and described, many changes, modifications, and substitutions may be made by one having ordinary skill in the art without necessarily departing from the spirit and scope of this invention.

I claim:

1. Apparatus for indicating the location of a plurality of locations at which the concentration of a gas is greatest and the concentration thereof, comprising:
   a plurality of sensing means for providing an electrical signal the amplitude of which is representative of the concentration of said gas, said sensing means being adapted to be positioned at each of said locations;
   peak selection circuit means for receiving said electrical signals and being responsive to the electrical signal of greatest amplitude to provide a first output indicative of that location and a voltage output having an amplitude representative of said concentration, said peak selection circuit means comprising:
   a power source;
   a plurality of transistors of substantially the same rating, each of said transistors having a base, an emitter and a collector;
   a constant current source;
   means coupling the emitter-collector paths of said transistors in parallel with each other and in series with said constant current source across said power source, and means for supplying one of said electrical signals to each transistor, such that only the transistor receiving the electrical signal of greatest magnitude will be conductive and the remainder of said transistors will be nonconductive;
   a plurality of indicator means, each of said indicator means being coupled to a respective transistor such that it provides an indication when said respective transistor is conductive; and
   conductor means coupled to the emitters of said transistors for presenting said voltage output.

2. The apparatus of claim 1 further comprising means for applying a small electrical signal to the base of the conductive transistor in addition to the electrical signal supplied thereto to form a resultant signal whereby another one of said transistors cannot conduct until the amplitude of the electrical signal supplied to the base thereof exceeds the amplitude of said resultant signal.

3. The apparatus of claim 2 further comprising means for amplifying the collector current of each of said transistors to drive its respective indicator means, said small electrical signal being a feedback signal derived from said amplifying means.

4. The apparatus of claim 1 further comprising a readout device coupled to said conductor means.

5. The apparatus of claim 4 further comprising a semiconductor device and a passive impedance element coupled across the emitter-collector paths of said transistors, said semiconductor device including a pn junction providing substantially the same voltage drop as the base-emitter junction of each of said transistors, said readout device being a voltmeter coupled to read the voltage between said pn junction and said impedance element.

6. The apparatus of claim 3 further comprising a readout device coupled to said conductor means.

7. The apparatus of claim 6 further comprising a semiconductor device and a passive impedance element coupled across the emitter-collector paths of said transistors, said semiconductor device including a pn junction providing substantially the same voltage drop as the base-emitter junction of each of said transistors, said readout device being a voltmeter coupled to read the voltage between said PN junction and said impedance element.

* * * * *